(12) United States Patent
Chai et al.

(10) Patent No.: US 12,299,810 B2
(45) Date of Patent: May 13, 2025

(54) LIGHT ESTIMATION METHOD FOR THREE-DIMENSIONAL (3D) RENDERED OBJECTS

(71) Applicant: Snap Inc., Santa Monica, CA (US)

(72) Inventors: Menglei Chai, Los Angeles, CA (US); Sergey Demyanov, Santa Monica, CA (US); Yunqing Hu, Los Angeles, CA (US); Istvan Marton, Encino, CA (US); Daniil Ostashev, London (GB); Aleksei Podkin, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 386 days.

(21) Appl. No.: 17/846,918

(22) Filed: Jun. 22, 2022

(65) Prior Publication Data
US 2023/0419599 A1 Dec. 28, 2023

(51) Int. Cl.
*G06T 15/50* (2011.01)
*G06T 15/80* (2011.01)
*G06V 10/774* (2022.01)
*G06V 10/82* (2022.01)

(52) U.S. Cl.
CPC ............ *G06T 15/506* (2013.01); *G06T 15/80* (2013.01); *G06V 10/774* (2022.01); *G06V 10/82* (2022.01); *G06T 2200/04* (2013.01); *G06T 2200/08* (2013.01)

(58) Field of Classification Search
None
See application file for complete search history.

(56) References Cited

U.S. PATENT DOCUMENTS 10,679,046 B1 * 6/2020 Black ................ G06V 40/23
2021/0065440 A1 * 3/2021 Sunkavalli ............ G06T 7/90

OTHER PUBLICATIONS

Chloe Legendre, "Learning Illumination from Diverse Portraits", Arxiv.org, Cornell University Library (Year: 2020).*
"International Application Serial No. PCT US2023 068377, International Search Report mailed Sep. 11, 2023", 4 pgs.
"International Application Serial No. PCT US2023 068377, Written Opinion mailed Sep. 11, 2023", 10 pgs.

(Continued)

*Primary Examiner* — James A Thompson
*Assistant Examiner* — Kim Thanh T Tran
(74) *Attorney, Agent, or Firm* — Schwegman Lundberg & Woessner, P.A.

(57) ABSTRACT

A method for applying lighting conditions to a virtual object in an augmented reality (AR) device is described. In one aspect, the method includes generating, using a camera of a mobile device, an image, accessing a virtual object corresponding to an object in the image, identifying lighting parameters of the virtual object based on a machine learning model that is pre-trained with a paired dataset, the paired dataset includes synthetic source data and synthetic target data, the synthetic source data includes environment maps and 3D scans of items depicted in the environment map, the synthetic target data includes a synthetic sphere image rendered in the same environment map, applying the lighting parameters to the virtual object, and displaying, in a display of the mobile device, the shaded virtual object as a layer to the image.

11 Claims, 14 Drawing Sheets

(56) References Cited

OTHER PUBLICATIONS

Legendre, Chloe, "Learning Illumination from Diverse Portraits", Arxiv.org, Cornell University Library 201 Olin Library Cornell University Ithaca, NY 14853, (Aug. 6, 2020), 14 pgs.
Legendre, Chloe, "DeepLight: Learning Illumination for Unconstrained Mobile Mixed Reality", IEEE CVF Conference on Computer Vision and Pattern Recognition (CVPR), (Jun. 1, 2019), 11 pgs.
Paul, Debevec, "Acquiring the reflectance field of a human face", Computer Graphics. SIGGRAPH Conference Proceedings. New Orleans, LA, [Computer Graphics Proceedings. SIGGRAPH], New York, NY : ACM, US, (Jul. 1, 2000), 12 pgs.
Zhang, Kai, "PhySG: Inverse Rendering with Spherical Gaussians for Physics-based Material Editing and Relighting", IEEE CVF Conference on Computer Vision and Pattern Recognition (CVPR), IEEE, (Jun. 20, 2021), 10 pgs.

\* cited by examiner

LIGHT ESTIMATION METHOD FOR THREE-DIMENSIONAL (3D) RENDERED OBJECTS

TECHNICAL FIELD

The subject matter disclosed herein generally relates to an Augmented Reality (AR) system. Specifically, the present disclosure addresses a method for light estimation for three-dimensional (3D) rendered virtual objects in an AR system.

BACKGROUND

Augmented reality (AR) allows users observe a scene while simultaneously seeing relevant virtual content that may be aligned to items, images, objects, or environments in the field of view of an AR device. As such, the AR device blends the rendered virtual content in the captured physical environment/scene (e.g., captured image) as much as possible to provide the user a more realistic experience. However, some rendered virtual content appear out of context or unrealistic due to the texture/brightness of the virtual content being inconsistent with the lighting conditions of a physical scene.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
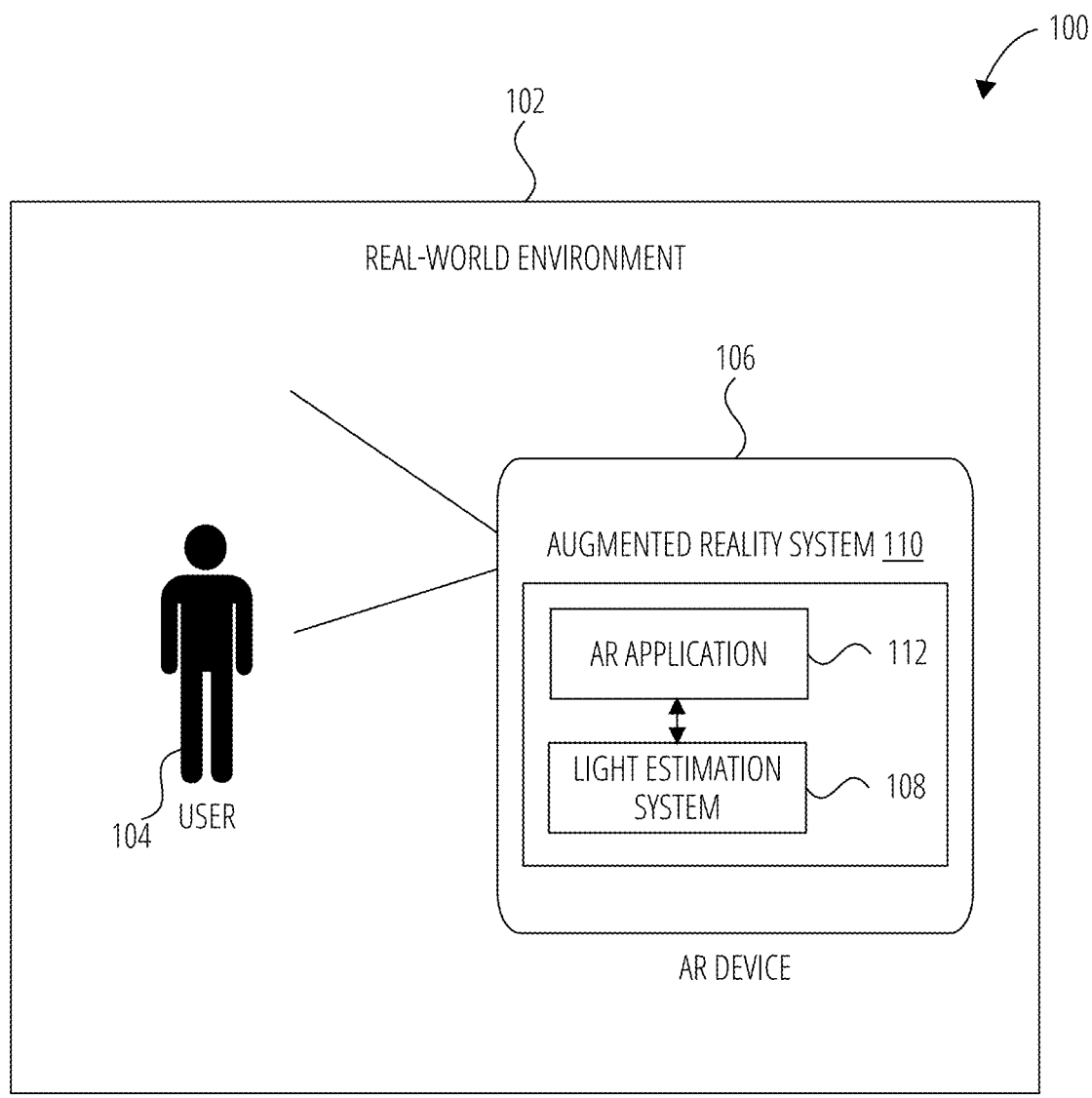
FIG. 1 is a block diagram illustrating an environment for operating an AR device in accordance with one example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural Components, such as modules) are optional and may be combined or subdivided, and operations (e.g., in a procedure, algorithm, or other function) may vary in sequence or be combined or subdivided.

The term "augmented reality" (AR) is used herein to refer to an interactive experience of a real-world environment where physical objects that reside in the real-world are "augmented" or enhanced by computer-generated digital content (also referred to as virtual content or synthetic content). AR can also refer to a system that enables a combination of real and virtual worlds, real-time interaction, and 3D registration of virtual and real objects. A user of an AR system perceives virtual content that appears to be attached/anchored/interact with a real-world physical object. The term "AR application" is used herein to refer to a computer-operated application that enables an AR experience.

The term "AR device" is used herein to refer to a computing device that operates the AR application. The AR device allows a user to access information, such as in the form of virtual content rendered in a display of an AR device (also referred to as display device). The rendering of the virtual content may be based on a position of the display device relative to a physical object or relative to a frame of reference (external to the display device) so that the virtual content correctly appears in the display.

Rendered AR objects are blended in the environment as much as possible to provide a user of the AR device a more realistic experience. For example, the AR device enables the user to visualize a piece of product (e.g., sunglasses, shoes, watches) on their body or in the physical environment (e.g., car, furniture). Typical rendered virtual content does not take into account light conditions of the physical environment. In the scenario where the AR device renders a pair of sunglasses on a user's face without considering the light conditions in the original scene, the user would sense the "fakeness" of the rendered sunglasses. To the user, the rendered virtual object appears to "jump out" of the frame, looking unnatural and unrealistic.

The present application describes a machine learning system for more realistic rendering by estimating the light conditions from the camera texture. In one example, the system collects a set of HDRI (high dynamic range imaging) environment maps and a set of 3D scans of real people. The system uses this data to render a paired dataset, where the source image is a character rendered inside an HDRI environment map and the target image is a sphere rendered in the same HDRI environment map.

During model training, the cropped faces from the source images are fed into a neural network that predicts light parameters (e.g., spherical gaussians to approximate light conditions, ambient light). A differential renderer uses the predicted parameters to render a new sphere (e.g., a predicted sphere image). The system then compares the new sphere with the corresponding target sphere. During model inference, the machine learning system provides the predicted parameters to a rendering engine (e.g., physically based rendering (PBR) shader) to apply the estimated light conditions to any rendered virtual object in a scene.

In one example embodiment, the present application describes a method for estimating light conditions for a rendered virtual object of an AR system. In one aspect, the method includes generating, using a camera of a mobile device, an image, accessing a virtual object corresponding to an object in the image, identifying shading parameters of the virtual object based on a machine learning model that is pre-trained with a paired dataset, the paired dataset includes synthetic source data and synthetic target data, the synthetic source data includes environment maps and 3D scans of items depicted in the environment map, the synthetic target data includes a synthetic sphere image rendered in the same environment map, applying the shading parameters to the virtual object, and displaying, in a display of the mobile device, the shaded virtual object as a layer to the image.

As a result, one or more of the methodologies described herein facilitate solving the technical problem of rendering virtual objects in an AR device. The presently described method provides an improvement to an operation for realistic rendering of the AR device by estimating the light conditions from camera texture.

FIG. 1 is a network diagram illustrating an environment 100 suitable for operating an AR device 106, according to some example embodiments. The environment 100 includes a user 104 and an AR device 106. The user 104 operates the AR device 106. For example, the user 104 is using the AR device 106 to capture a self portrait image (also referred to as a selfie) of the user's face. The user 104 may be a human user (e.g., a human being), a machine user (e.g., a computer configured by a software program to interact with the AR device 106), or any suitable combination thereof (e.g., a human assisted by a machine or a machine supervised by a human).

The AR device 106 may be a computing device that with a display such as a smartphone, a tablet computer, or a wearable computing device (e.g., watch or glasses). The computing device may be hand-held or may be removable mounted to a head of the user 104. In one example, the display includes a screen that displays images captured with a camera of the AR device 106. In another example, the display of the device may be transparent, such as in lenses of wearable computing glasses, that allow the user 104 to view virtual content presented on the display while also viewing real-world objects in the line of sight of the user 104 through the display. In other examples, the display may be non-transparent, partially transparent, partially opaque. In yet other examples, the display may be wearable by the user 104 to cover a portion of the field of vision of the user 104.

The AR device 106 includes an augmented reality system 110 that generates lighting-dependent (also referred to as "shaded") virtual content based on images detected with the camera of the AR device 106. For example, the user 104 may point a camera of the AR device 106 to capture an image of a face of the user 104 or a physical object (not shown) in a scene of the real-world environment 102. The augmented reality system 110 generates lighting-dependent virtual content (e.g., shaded virtual sunglasses) corresponding to an identified object (e.g., face of the user 104) in the image based on the existing lighting conditions in the scene of the real-world environment 102. An example of a scene includes a portion of the real-world environment 102 captured by a camera of the AR device 106.

The AR device 106 presents the shaded virtual content (e.g., shaded virtual sunglasses) in a display of the AR device 106. In another example, the augmented reality system 110 renders the virtual content, applies a shading based on the existing lighting conditions of the scene, and presents the shaded virtual content in a display of the AR device 106 relative to a frame of reference (external to the display device) so that the virtual content correctly appears in the display. In other words, the shaded virtual content (e.g., virtual sunglasses) appear anchored to the face to the user 104.

In one example embodiment, the augmented reality system 110 includes a light estimation system 108 and an AR application 112. The AR application 112 detects and identifies a physical environment (e.g., real-world environment 102), an item (e.g., a face of the user 104, shoes, a body part of the user such as a wrist) depicted in an image captured by a camera of the AR device 106 using computer vision. The AR application 112 retrieves virtual content (e.g., 3D object model of sunglasses) based on the identified item/physical object or scene in the real-world environment 102. The AR application 112 renders the virtual object in the display 204. In another example, the AR application 112 accesses estimated light conditions (e.g., lighting/shading parameters) from the light estimation system 108 and applies the predicted lighting parameters to a physically-based renderer (also referred to as PBR) that applies the estimated light conditions to the virtual object (e.g., sunglasses). The AR application 112 displays the shaded virtual object (e.g., shaded sunglasses) as an overlay on the face of the user 104.

The light estimation system 108 identifies predicted lighting parameters (e.g., shading parameters, ambient light) for a virtual object/item (e.g., sunglasses) based on lighting conditions in the image of the face of the user 104. In another example, the light estimation system 108 accesses the virtual object model from the AR application 112 and uses a renderer to apply the predicted lighting parameters (e.g., estimated ambient light conditions) to the virtual object (e.g., sunglasses) to generate a more realistic virtual object consistent with the light conditions in the scene captured by the camera of the AR device 106. The light estimation system 108 includes a machine learning model that is trained using supervised training with synthetic data. The light estimation system 108 is described in more detail below with respect to FIG. 4.

In another example embodiment, the augmented reality system 110 includes other applications such as a 6DOF tracking system, or a depth sensing system.

Any of the machines, databases, or devices shown in FIG. 1 may be implemented in a general-purpose computer modified (e.g., configured or programmed) by software to be a special-purpose computer to perform one or more of the functions described herein for that machine, database, or device. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The AR device 106 may operate over a computer network. The computer network may be any network that enables communication between or among machines, databases, and devices. Accordingly, the computer network may be a wired network, a wireless network (e.g., a mobile or cellular network), or any suitable combination thereof. The computer network may include one or more portions that constitute a private network, a public network (e.g., the Internet), or any suitable combination thereof.

Figure 2:
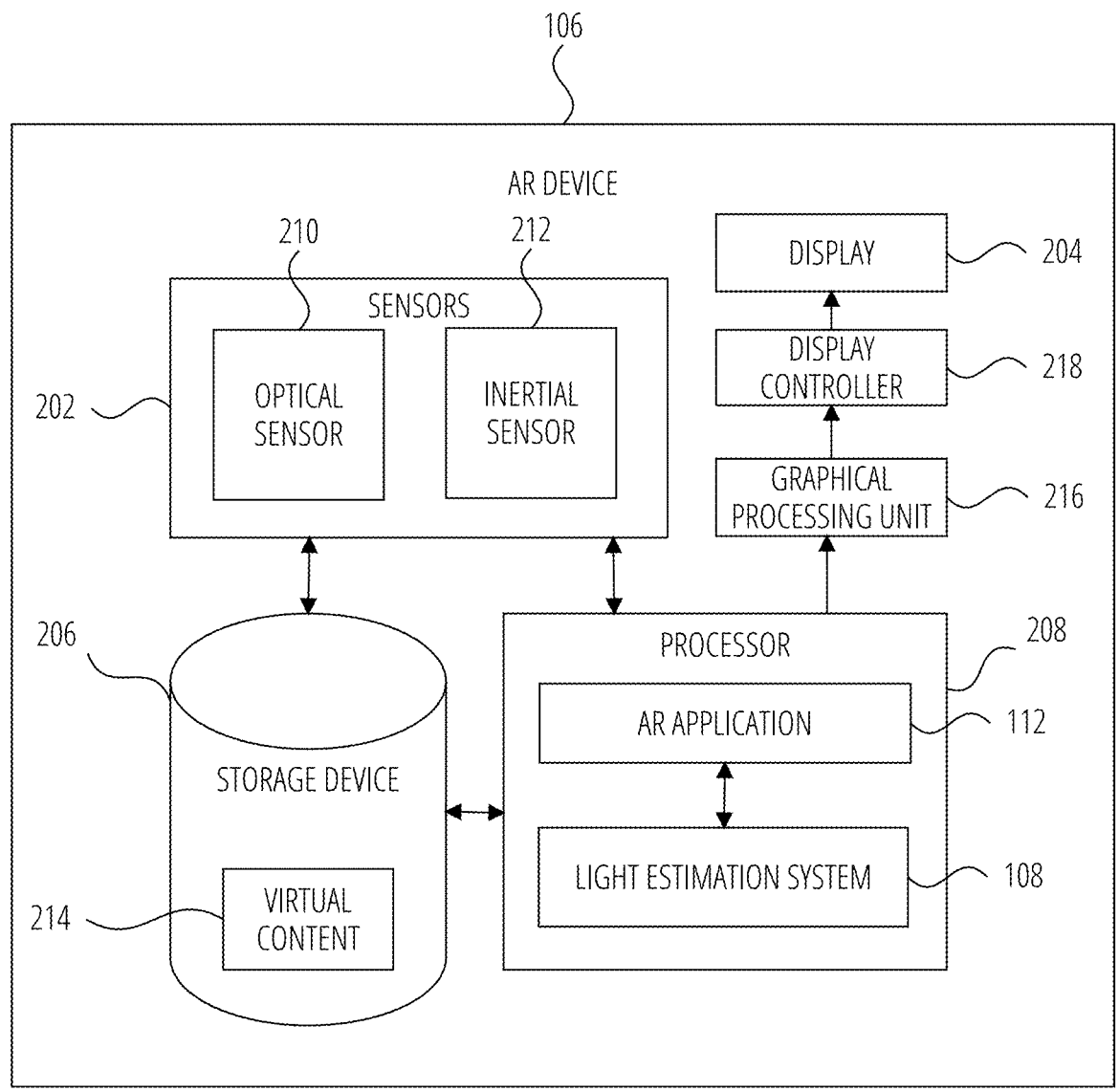
FIG. 2 is a block diagram illustrating an AR device in accordance with one example embodiment.

FIG. 2 is a block diagram illustrating modules (e.g., components) of the AR device 106, according to some example embodiments. The AR device 106 includes sensors 202, a display 204, a display controller 218, a graphical processing unit 216, a processor 208, and a storage device 206. Examples of AR device 106 include a wearable computing device, a mobile computing device, a navigational device, a smart phone, and the like.

The sensors 202 include, for example, an optical sensor 210 (e.g., camera such as a color camera, a thermal camera, a depth sensor and one or multiple grayscale, global/rolling shutter tracking cameras) and an inertial sensor 212 (e.g., gyroscope, accelerometer). Other examples of sensors 202 include a proximity or location sensor (e.g., near field communication, GPS, Bluetooth, Wi-Fi), an audio sensor (e.g., a microphone), or any suitable combination thereof. It is noted that the sensors 202 described herein are for illustration purposes and the sensors 202 are thus not limited to the ones described above.

The processor 208 implements and operates the AR application 112 and the light estimation system 108. The AR application 112 detects and identifies, using computer vision, a physical item/object (e.g., face of the user 104) or a physical environment (e.g., real-world environment 102). The AR application 112 retrieves virtual content (e.g., 3D object model) based on the identified physical item (e.g., face of the user 104) or physical environment. The AR application 112 renders the virtual object in the display 204 so that the virtual object appears anchored to the physical environment or the physical item. In one example embodiment, the AR application 112 includes a local rendering engine that generates a visualization of virtual content overlaid (e.g., superimposed upon, or otherwise displayed in tandem with) on an image of the physical item captured by the optical sensor 210. A visualization of the virtual content may be manipulated by adjusting a position of the physical item (e.g., its physical location, orientation, or both) relative to the optical sensor 210. Similarly, the visualization of the virtual content may be manipulated by adjusting a pose of the AR device 106 relative to the physical item.

In one example, the AR application 112 accesses rotational motion data of the AR device 106 using sensor data from IMU sensors (e.g., the inertial sensor 212). The processor 208 captures rotational and translational motion data of the AR device 106. The processor 208 uses image data and corresponding inertial data from the optical sensor 210 and the inertial sensor 212 to track a location and pose of the AR device 106 relative to a frame of reference (e.g., real-world environment 102, face of the user 104).

The light estimation system 108 identifies predicted lighting parameters (e.g., shading parameters) for the virtual object/item (e.g., sunglasses) based lighting conditions in the image captured by the optical sensor 210. In another example, the light estimation system 108 applies, with a render engine (not shown) at the graphical processing unit 216, the predicted lighting parameters (e.g., estimated light conditions) to a texture of the virtual object (e.g., sunglasses) to generate a more realistic virtual object consistent with the light conditions in the scene captured by the optical sensor 210 of the AR device 106. The light estimation system 108 includes a machine learning model that is trained using synthetic data of HDRI environment maps and 3D scans of persons. The light estimation system 108 is described in more detail below with respect to FIG. 4.

The graphical processing unit 216 includes a render engine (not shown) that is configured to render a frame/texture/shading of a 3D model of a virtual object based on the virtual content provided by the AR application, the pose of the AR device 106, and the shading parameters from the light estimation system 108. In other words, the graphical processing unit 216 uses the three-dimensional pose of the AR device 106 to generate frames of shaded virtual content to be presented on the display 204. For example, the graphical processing unit 216 uses the three-dimensional pose to render a frame of the virtual content such that the virtual content is presented at an orientation and position in the display 204 to properly augment the user's reality. As an example, the graphical processing unit 216 may use the three-dimensional pose data to render a frame of virtual content such that, when presented on the display 204, the virtual content overlaps with a physical object in the user's real world environment 102. The graphical processing unit 216 generates updated frames of shaded virtual content based on updated three-dimensional poses of the graphical processing unit 216, which reflect changes in the position and orientation of the user in relation to physical objects in the user's real world environment 102.

The graphical processing unit 216 transfers the rendered frame to the display controller 218. The display controller 218 is positioned as an intermediary between the display controller 218 and the display 204, receives the image data (e.g., rendered frame) from the graphical processing unit 216, provides the rendered frame to display 204.

The display 204 includes a screen or monitor configured to display images generated by the processor 208. In one example embodiment, the display 204 may be transparent or semi-opaque so that the user 104 can see through the display 204 (in AR use case). In another example embodiment, the display 204 covers the eyes of the user 104 and blocks out the entire field of view of the user 104 (in VR use case). In another example, the display 204 includes a touchscreen display configured to receive a user input via a contact on the touchscreen display.

The storage device 206 stores virtual content 214. The virtual content 214 includes, for example, a lighting conditions machine learning model, a database of visual references (e.g., images of physical objects) and corresponding experiences (e.g., three-dimensional virtual object models). Other augmentation data that may be stored within the storage device 206 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of an AR device 106 and then displayed on a screen of the AR device 106 with the modifications.

This also includes modifications to stored content, such as video clips in a gallery that may be modified. For example, in an AR device 106 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of an AR device 106 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the AR device 106) and perform complex image manipulations locally on the AR device 106 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the AR device 106.

In some examples, a computer animation model to transform image data can be used by a system where a user may capture an image or video stream of the user (e.g., a selfie) using an AR device 106 having a neural network operating as part of an AR application operating on the AR device 106. The transformation system operating within the AR application determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the AR device 106 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
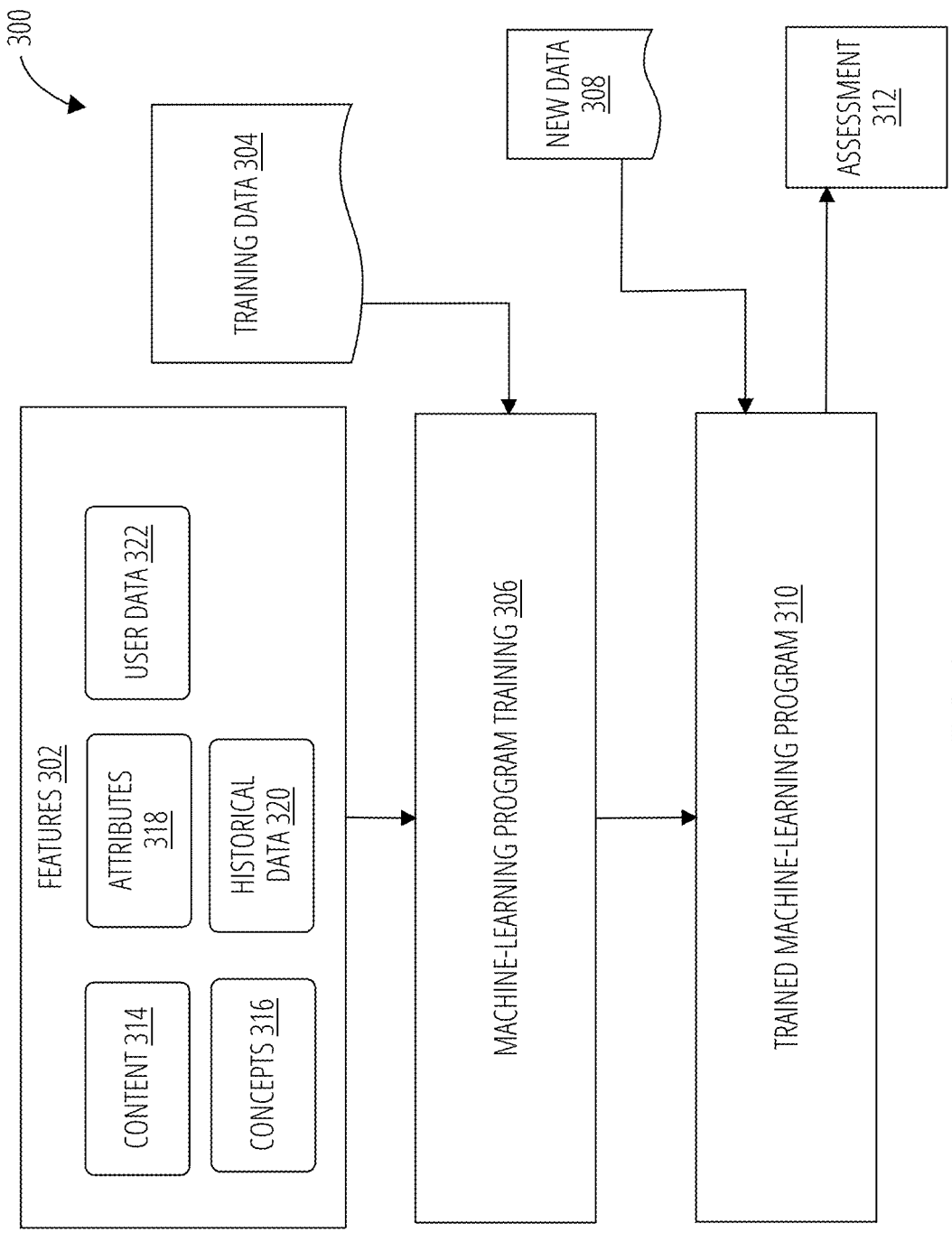
FIG. 3 illustrates training and use of a machine-learning program, according to some example embodiments.

FIG. 3 illustrates training and use of a machine-learning program 300, according to some example embodiments. In some example embodiments, machine-learning programs (MLPs), also referred to as machine-learning algorithms or tools, are used to perform operations associated with light conditions parameters.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 304 in order to make data-driven predictions or decisions expressed as outputs or assessments (e.g., assessment 312). Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values, such as classifying an object as a type of fruit (e.g., an apple or an orange). Regression algorithms aim at quantifying some items, such as by providing a value that is a real number.

The machine-learning algorithms use features 302 for analyzing the data to generate an assessment 312. Each of the features 302 is an individual measurable property of a phenomenon being observed. The concept of a feature is related to that of an explanatory variable used in statistical techniques such as linear regression. Choosing informative, discriminating, and independent features is important for the effective operation of the MLP in pattern recognition, classification, and regression. Features may be of different types, such as numeric features, strings, and graphs.

In one example embodiment, the features 302 may be of different types and may include one or more of content 314, concepts 316, attributes 318, historical data 320 and/or user data 322, merely for example.

The machine-learning algorithms use the training data 304 to find correlations among the identified features 302 that affect the outcome or assessment 312. In some example embodiments, the training data 304 includes labeled data, which is known data for one or more identified features 302 and one or more outcomes, such as detecting lighting patterns or parameters.

With the training data 304 and the identified features 302, the machine-learning tool is trained at machine-learning program training 306. The machine-learning tool appraises the value of the features 302 as they correlate to the training data 304. The result of the training is the trained machine-learning program 310.

When the trained machine-learning program 310 is used to perform an assessment, new data 308 is provided as an input to the trained machine-learning program 310, and the trained machine-learning program 310 generates the assessment 312 as output.

Figure 4:
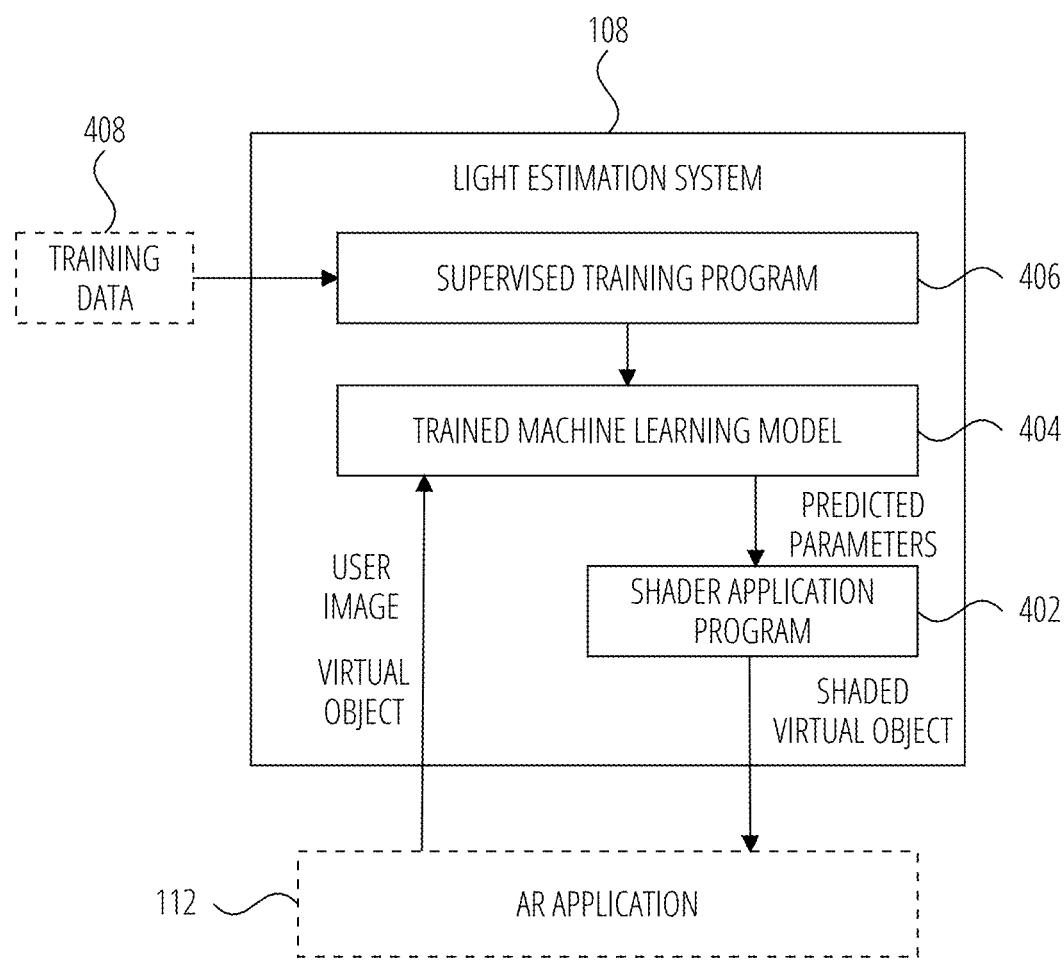
FIG. 4 is a block diagram illustrating a light estimation system in accordance with one example embodiment.

FIG. 4 is a block diagram illustrating a light estimation system 108 in accordance with one example embodiment. The light estimation system 108 includes a supervised training program 406, a trained machine learning model 404, and a shader application program 402.

The supervised training program 406 uses training data 408 (e.g., synthetic data) to train the machine learning model (e.g., trained machine learning model 404). In one example, the training data 408 includes a set of HDRI environment maps and a set of 3D scans of real people. The supervised training program 406 uses the training data 408 to render a paired dataset, where the source image is an object (e.g., character) rendered inside the HDRI environment map and the target image is a sphere rendered in the same HDRI environment map. In one example embodiment, during the model training, training data 408 (e.g., cropped faces of 3D scans of real people from source images) are fed into a neural network of the supervised training program 406 and predicts lighting parameters (e.g., spherical gaussians, ambient light). The supervised training program 406 uses these predicted parameters to render a new predicted sphere image and compares the rendered new predicted sphere image with a corresponding target synthetic sphere image using L2 loss.

The trained machine learning model 404 can be used to generate predicted lighting parameters based on an image of the object used during training (e.g., the face of the user 104). For example, the AR application 112 captures a self portrait image of the user 104. The AR application 112 identifies virtual sunglasses to be rendered on the face of the user 104. The AR application 112 provides the image data (self portrait image) and the virtual object model (e.g., textured 3D model of sunglasses) to the trained machine learning model 404. The light estimation system 108 applies the trained machine learning model 404 to generate predicted lighting parameters for the virtual object.

During model inference, the trained machine learning model 404 provides the predicted lighting parameters to the shader application program 402 to apply the lighting parameters to the shaded texture of the 3D model. The shader application program 402 includes, for example, a PBR shader engine. The shader application program 402 provides the shaded virtual object based on the AR application 112. The AR application 112 displays the shaded virtual object in the display 204.

Figure 5:
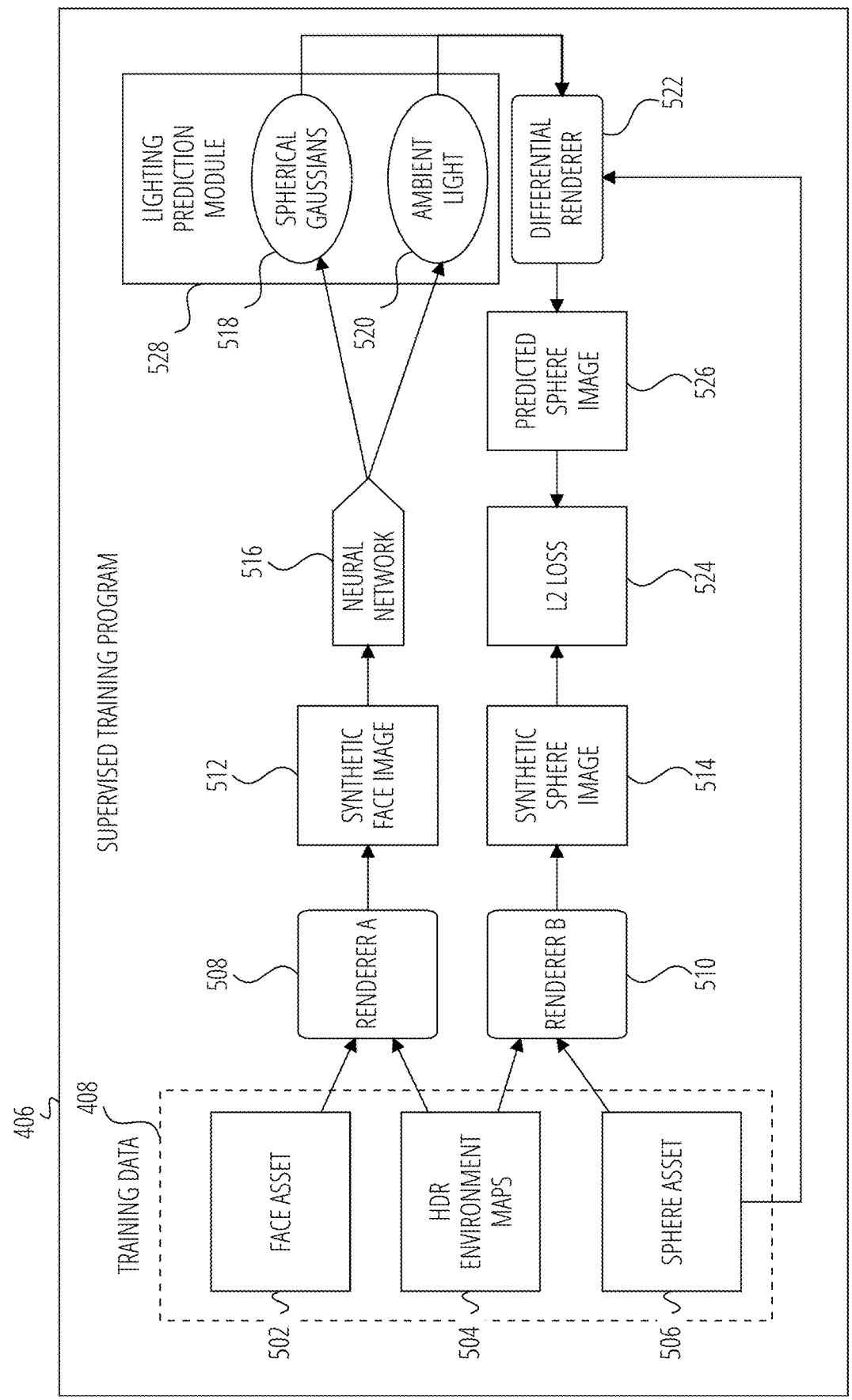
FIG. 5 is a block diagram illustrating a supervised training program in accordance with one example embodiment.

FIG. 5 is a block diagram illustrating the supervised training program 406 in accordance with one example embodiment. The supervised training program 406 includes a face asset 502, an HDR environment maps 504, a sphere asset 506, a renderer A 508, a renderer B 510, a synthetic face image 512, a synthetic sphere image 514, a neural network 516, a spherical Gaussians 518, an ambient light 520, a differential renderer 522, an L2 loss 524, a predicted sphere image 526, and a lighting prediction module 528.

Training data 408 includes the face asset 502, the HDR environment maps 504, and sphere asset 506. Examples of face asset 502 include cropped 3D scans of real people. Example of HDR environment maps 504 include HDRI maps from taken from different places. Examples of sphere asset 506 include synthetic sphere 3D models with configurable materials. While the example of a face is given, the same technique can be used with any object to correct the lighting of virtual objects presented along with the object.

The renderer A 508 includes a render engine that renders a synthetic face image 512 based on the face asset 502 and the HDR environment maps 504. The synthetic face image 512 is fed into a neural network 516 to predict lighting prediction module 528 (e.g., parameters for spherical Gaussians 518 and ambient light 520). A differential renderer 522 renders the predicted sphere image 526 based on the sphere asset 506 and the parameters for spherical Gaussians 518 and ambient light 520.

The renderer B 510 includes a render engine that renders a synthetic sphere image 514 based on the HDR environment maps 504 and the sphere asset 506. An L2 loss 524 is used to compare the synthetic sphere image 514 with the predicted sphere image 526. In another example, the result of the L2 loss 524 is used to train the neural network via back-propagation.

Figure 6:
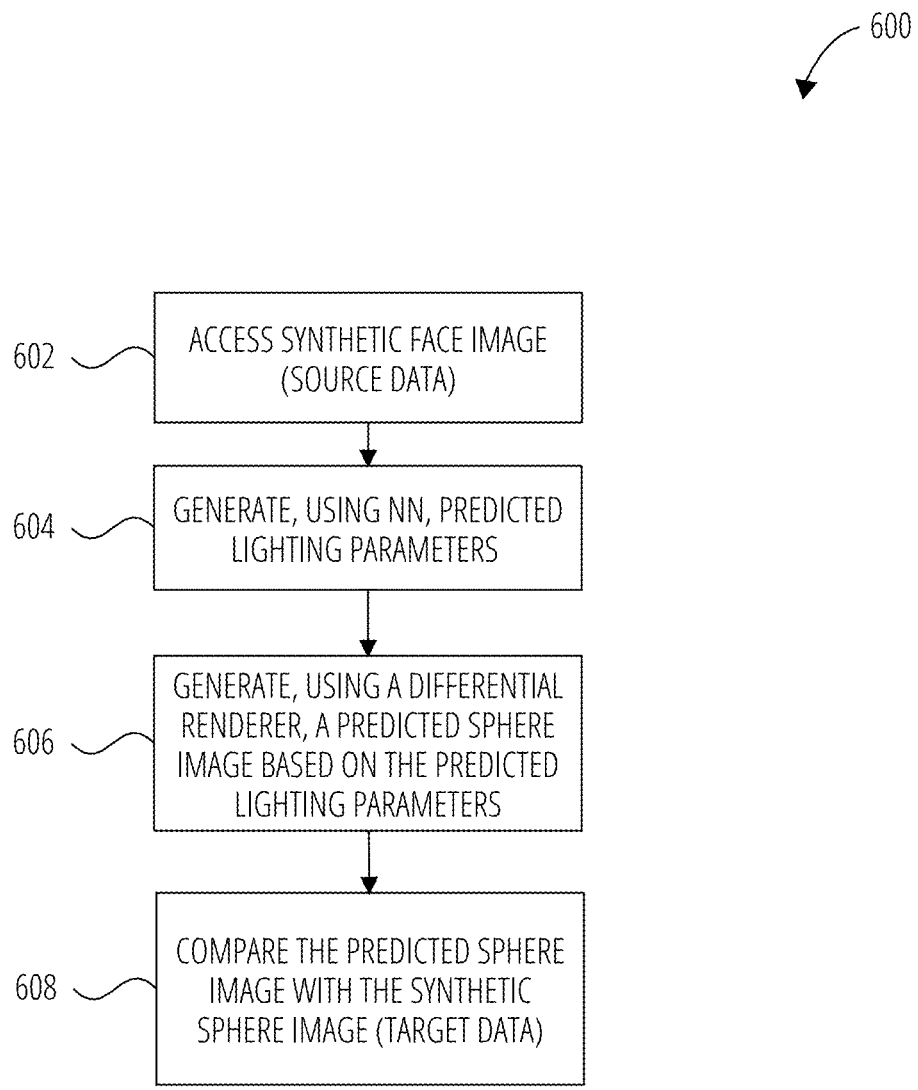
FIG. 6 illustrates a method for training a machine learning model in accordance with one example embodiment.

FIG. 6 is a flowchart illustrating a method 600 in accordance with one example embodiment. Operations of the method 600 may be performed by the augmented reality system 110. In one example, the method 600 can be operated with the light estimation system 108.

In block 602, the supervised training program 406 accesses a synthetic face image (source data). In block 604, the supervised training program 406 generates, using NN, predicted lighting parameters (e.g., spherical gaussians, ambient light). In block 606, the supervised training program 406 generates, using a differential renderer, a predicted sphere image based on the predicted lighting parameters. In block 608, the supervised training program 406 compares the predicted sphere image with the synthetic sphere image (target data).

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 7:
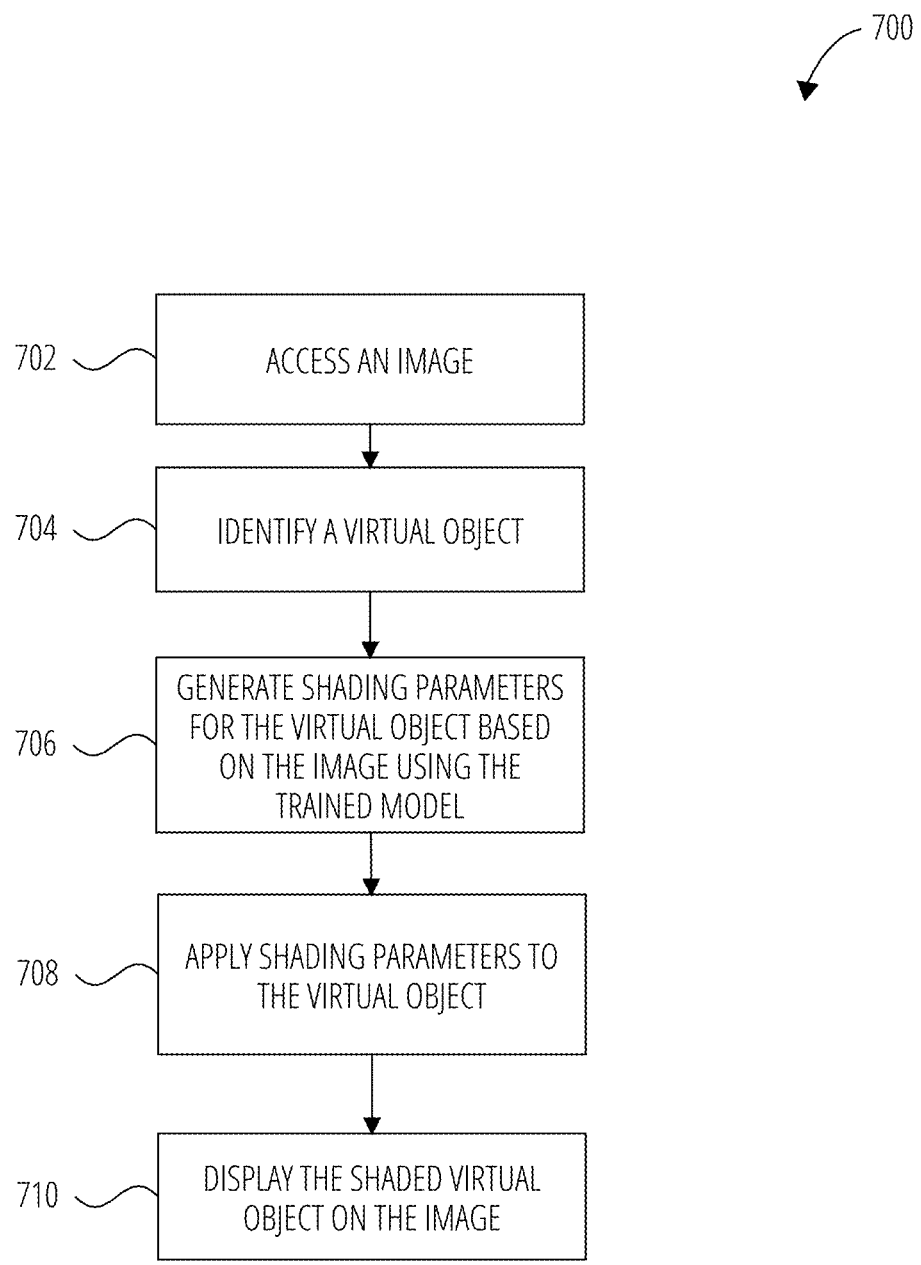
FIG. 7 illustrates a method for using a machine learning model to apply shades to a virtual object in accordance with one example embodiment.

FIG. 7 is a flowchart illustrating a method 700 in accordance with one example embodiment. Operations of the method 700 may be performed by the augmented reality system 110, the light estimation system 108, or any combination thereof.

In block 702, the AR application 112 accesses an image. In block 704, the AR application 112 identifies a virtual object. In block 706, the light estimation system 108 generates shading parameters for the virtual object based on the image using the trained model. In block 708, the light estimation system 108 applies shading parameters to the virtual object. In block 710, the AR application 112 displays the shaded virtual object as an overlay on the image.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 8:
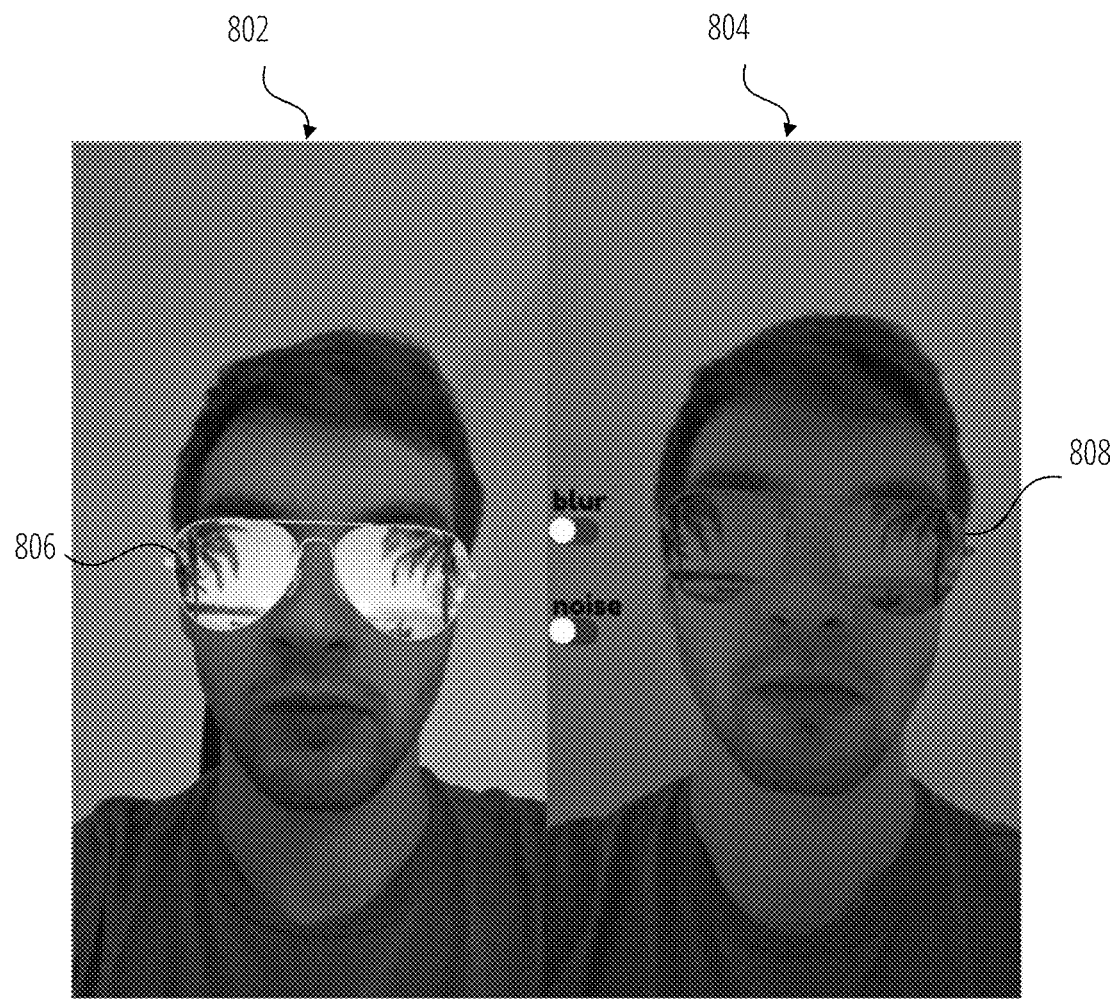
FIG. 8 illustrates examples of lighting conditions independent virtual object and lighting conditions dependent virtual object in accordance with one example embodiment.

FIG. 8 illustrates examples of lighting conditions independent virtual object and lighting conditions dependent virtual object in accordance with one example embodiment. The unshaded virtual object image 802 illustrates fixed lighting parameter shaded virtual sunglasses 806 that appear "fake" with the image of the user. The shaded virtual object image 804 illustrates predicted lighting parameter shaded virtual sunglasses 808 on the face of the user. The predicted lighting parameter shaded virtual sunglasses 808 are shaded based on lighting conditions in the self portrait image of the user.

Figure 9:
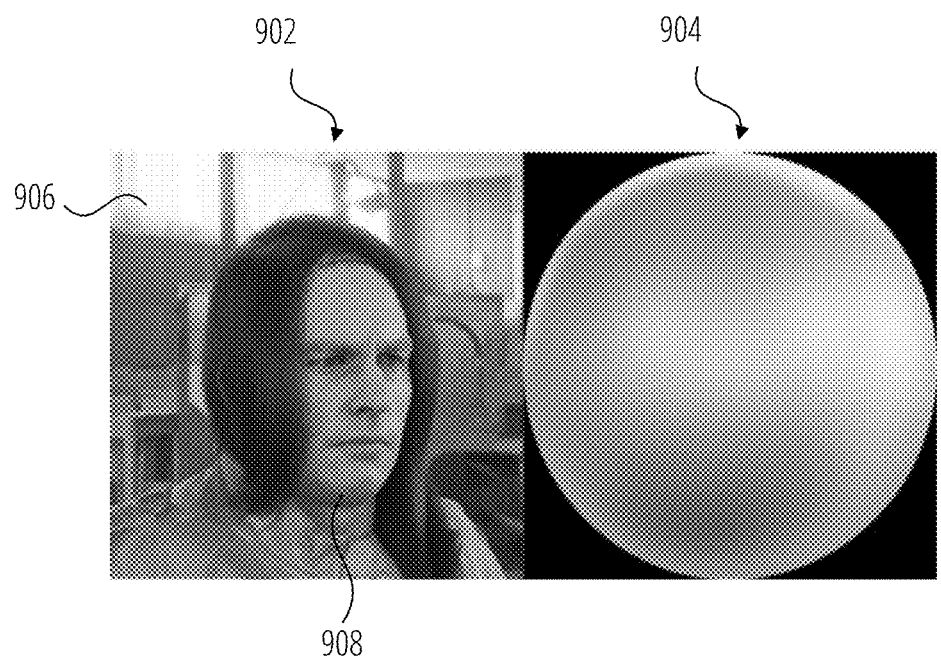
FIG. 9 illustrates an example of source data and target data in accordance with one example embodiment.

FIG. 9 illustrates an example of source data and target data in accordance with one example embodiment. An example of source data includes source image 902 (e.g., 3D facial scan of person 908) and HDRI environment map 906). An example of target data includes target image 904 (e.g., a synthetic 3D sphere rendered in the same HDRI environment map 906).

Figure 10:
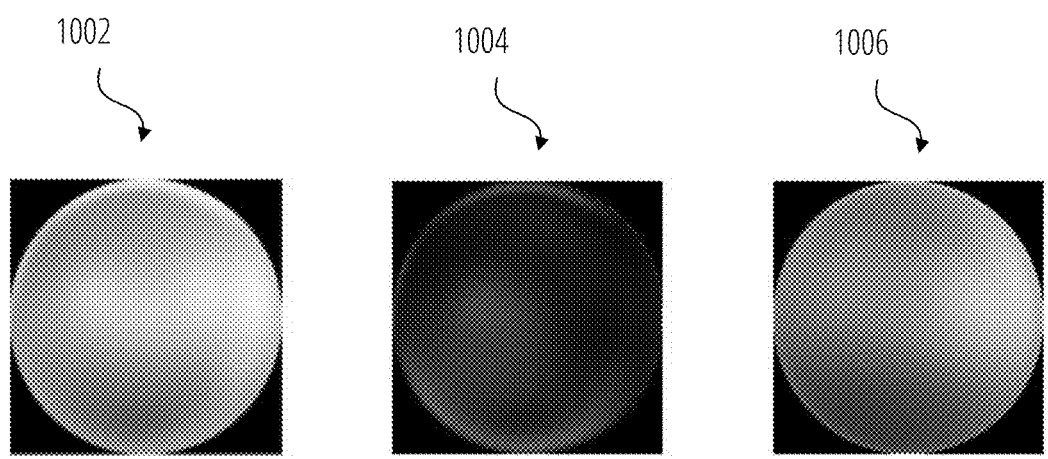
FIG. 10 illustrates predicted lighting conditions for a virtual object in accordance with one example embodiment.

FIG. 10 illustrates predicted lighting conditions for a virtual object in accordance with one example embodiment. The synthetic sphere image 1002 illustrates a synthetic sphere rendered in an HDRI environment map. The predicted sphere image 1006 illustrates a rendered sphere image based on predicted lighting conditions. The comparison result 1004 is based on a comparison between the synthetic sphere image 1002 and the predicted sphere image 1006.

Figure 11:
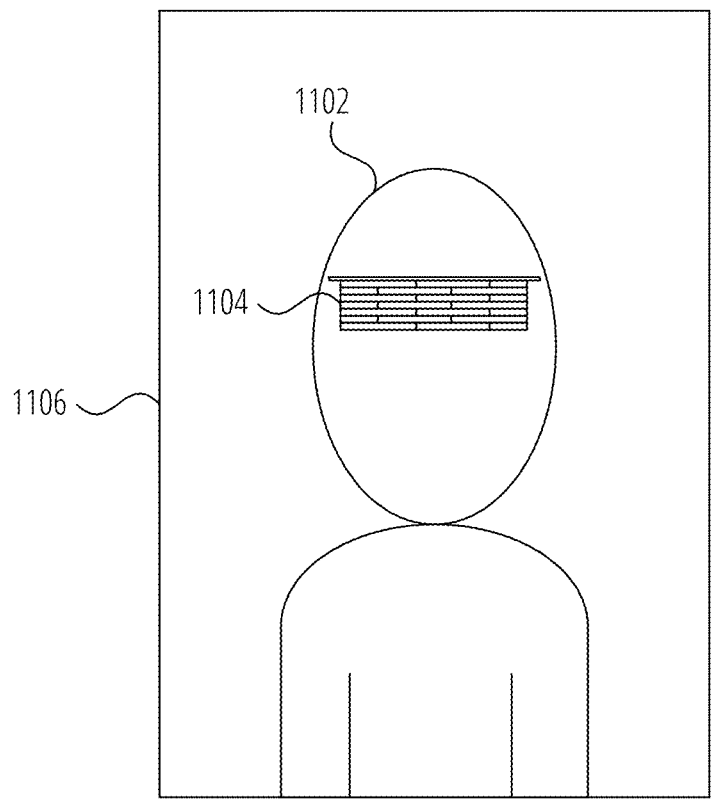
FIG. 11 illustrates an example of a shaded virtual object in accordance with one embodiment.

FIG. 11 illustrates an example of a shaded virtual object in accordance with one embodiment. The self portrait image 1106 depicts a user face 1102 with shaded virtual content 1104.

Figure 12:
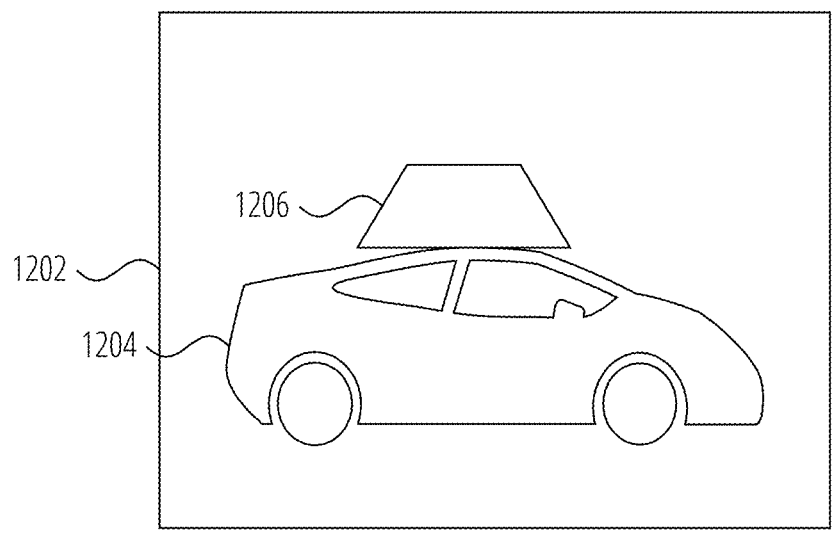
FIG. 12 illustrates an example of a shaded virtual object in accordance with one embodiment.

FIG. 12 illustrates an example of a shaded virtual object in accordance with one embodiment. The example display 1202 depicts an image of a car 1204 (captured by a camera of the AR device 106) with shaded virtual object 1206.

Figure 13:
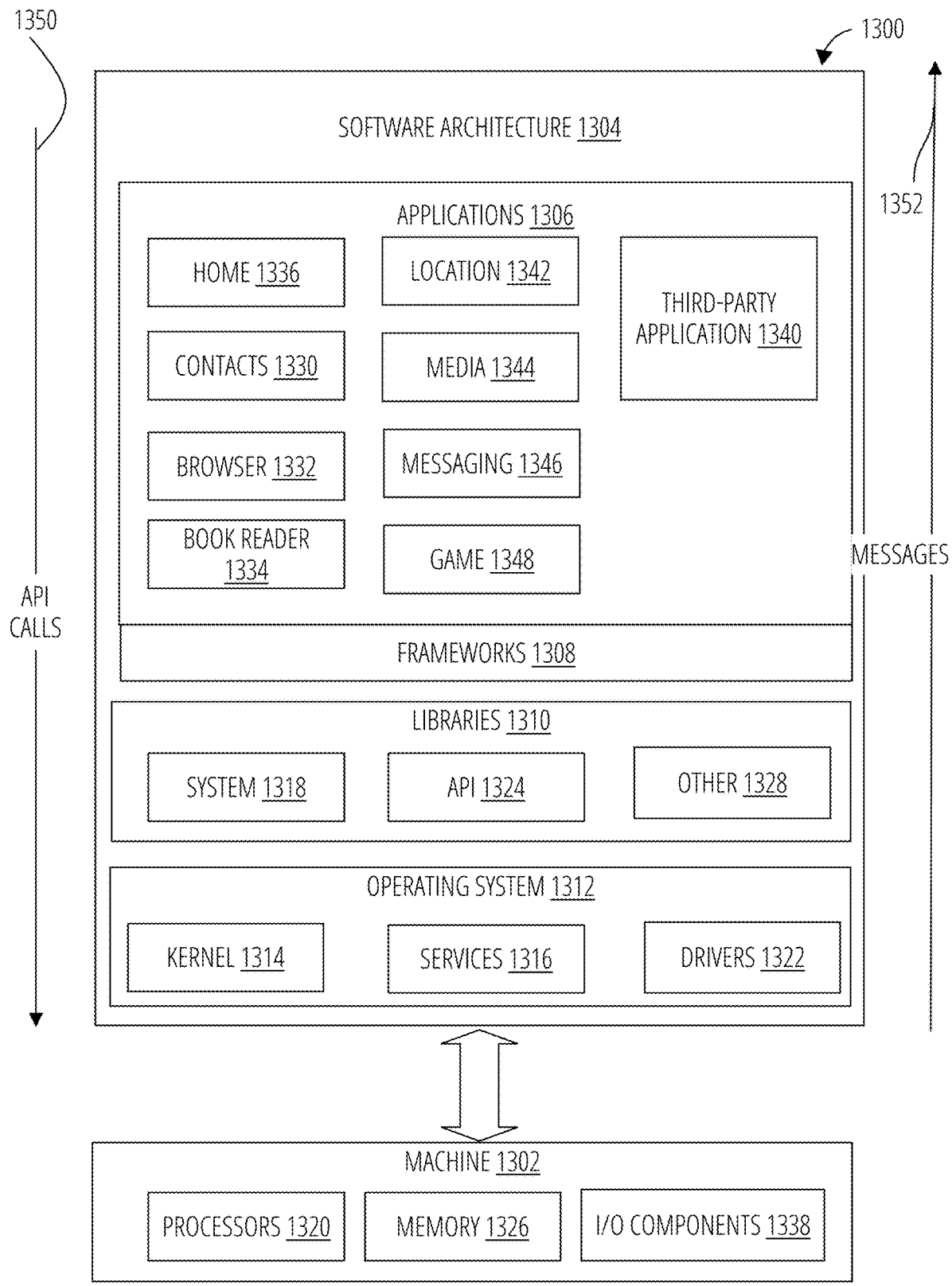
FIG. 13 is block diagram showing a software architecture within which the present disclosure may be implemented, according to an example embodiment.

FIG. 13 is a block diagram 1300 illustrating a software architecture 1304, which can be installed on any one or more of the devices described herein. The software architecture 1304 is supported by hardware such as a 1302 that includes processors 1320, memory 1326, and I/O components 1338. In this example, the software architecture 1304 can be conceptualized as a stack of layers, where each layer provides a particular functionality. The software architecture 1304 includes layers such as an operating system 1312, libraries 1310, frameworks 1308, and applications 1306. Operationally, the applications 1306 invoke API calls 1350 through the software stack and receive messages 1352 in response to the API calls 1350.

The operating system 1312 manages hardware resources and provides common services. The operating system 1312 includes, for example, a kernel 1314, services 1316, and drivers 1322. The kernel 1314 acts as an abstraction layer between the hardware and the other software layers. For example, the kernel 1314 provides memory management, Processor management (e.g., scheduling), Component management, networking, and security settings, among other functionalities. The services 1316 can provide other common services for the other software layers. The drivers 1322 are responsible for controlling or interfacing with the underlying hardware. For instance, the drivers 1322 can include display drivers, camera drivers, BLUETOOTH® or BLUETOOTH® Low Energy drivers, flash memory drivers, serial communication drivers (e.g., Universal Serial Bus (USB) drivers), WI-FED drivers, audio drivers, power management drivers, and so forth.

The libraries 1310 provide a low-level common infrastructure used by the applications 1306. The libraries 1310 can include 1318 (e.g., C standard library) that provide functions such as memory allocation functions, string manipulation functions, mathematic functions, and the like. In addition, the libraries 1310 can include 1324 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1310 can also include a wide variety of 1328 to provide many other APIs to the applications 1306.

The frameworks 1308 provide a high-level common infrastructure that is used by the applications 1306. For example, the frameworks 1308 provide various graphical user interface (GUI) functions, high-level resource management, and high-level location services. The frameworks 1308 can provide a broad spectrum of other APIs that can be used by the applications 1306, some of which may be specific to a particular operating system or platform.

In an example embodiment, the applications 1306 may include a 1336, a 1330, a 1332, a 1334, a 1342, a 1344, a 1346, a 1348, and a broad assortment of other applications such as a third-party application 1340. The applications 1306 are programs that execute functions defined in the programs. Various programming languages can be employed to create one or more of the applications 1306, structured in a variety of manners, such as object-oriented programming languages (e.g., Objective-C, Java, or C++) or procedural programming languages (e.g., C or assembly language). In a specific example, the third-party application 1340 (e.g., an application developed using the ANDROID™ or IOS™ software development kit (SDK) by an entity other than the vendor of the particular platform) may be mobile software running on a mobile operating system such as IOS™ ANDROID™, WINDOWS® Phone, or another mobile operating system. In this example, the third-party application 1340 can invoke the API calls 1350 provided by the operating system 1312 to facilitate functionality described herein.

Figure 14:
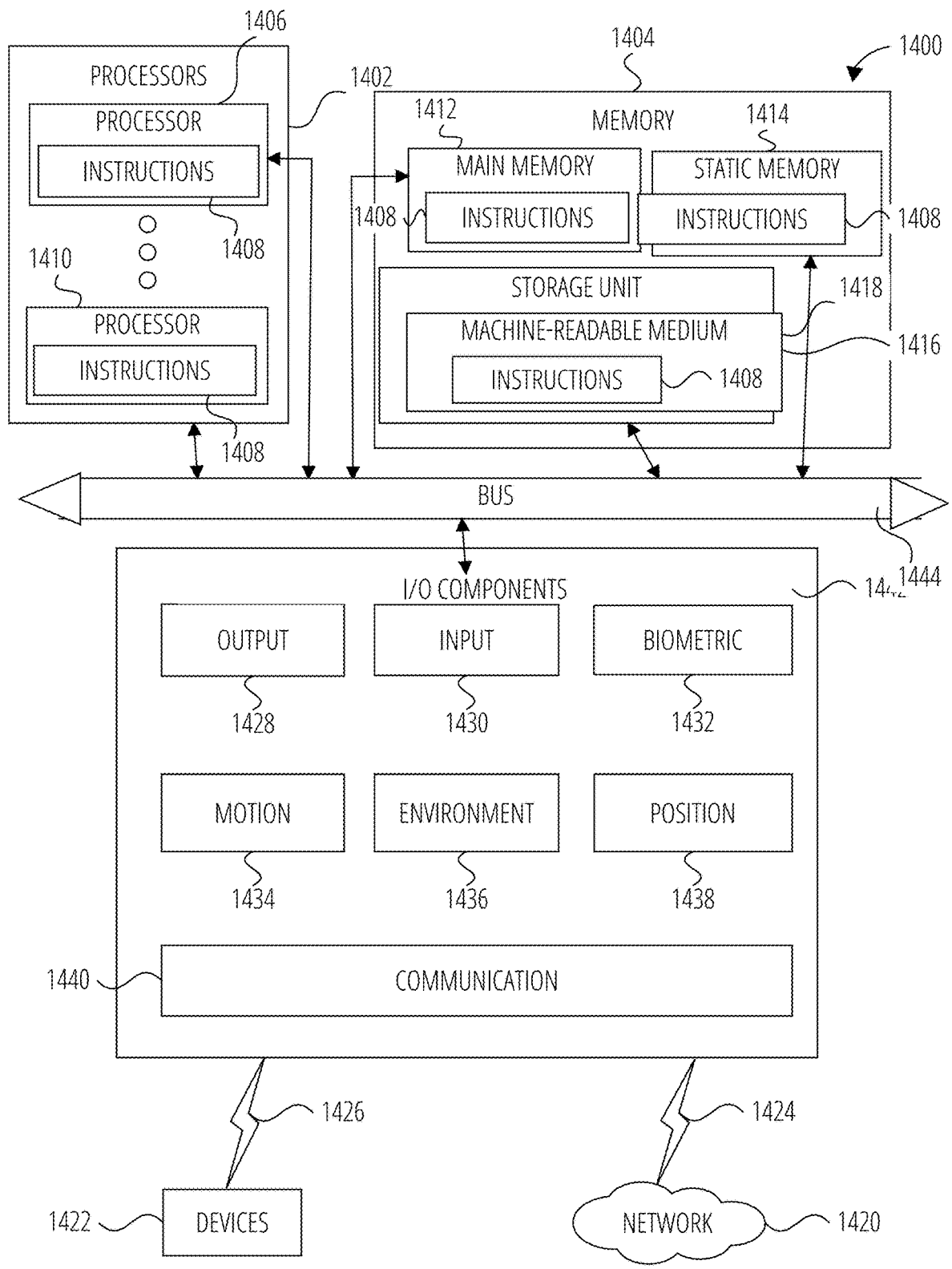
FIG. 14 is a diagrammatic representation of a machine in the form of a computer system within which a set of instructions may be executed for causing the machine to perform any one or more of the methodologies discussed herein, according to one example embodiment.

FIG. 14 is a diagrammatic representation of the computer 1400 within which instructions 1408 (e.g., software, a program, an application, an applet, an app, or other executable code) for causing the computer 1400 to perform any one or more of the methodologies discussed herein may be executed. For example, the instructions 1408 may cause the computer 1400 to execute any one or more of the methods described herein. The instructions 1408 transform the general, non-programmed computer 1400 into a particular computer 1400 programmed to carry out the described and illustrated functions in the manner described. The computer 1400 may operate as a standalone device or may be coupled (e.g., networked) to other machines. In a networked deployment, the computer 1400 may operate in the capacity of a server machine or a client machine in a server-client network environment, or as a peer machine in a peer-to-peer (or distributed) network environment. The computer 1400 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1408, sequentially or otherwise, that specify actions to be taken by the computer 1400. Further, while only a single computer 1400 is illustrated, the term "machine" shall also be taken to include a collection of machines that individually or jointly execute the instructions 1408 to perform any one or more of the methodologies discussed herein.

The computer 1400 may include processors 1402, memory 1404, and I/O components 1442, which may be configured to communicate with each other via a 1444. In an example embodiment, the processors 1402 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a processor 1406 and a processor 1410 that execute the instructions 1408. The term "Processor" is intended to include multi-core Processors that may comprise two or more independent Processors (sometimes referred to as "cores") that may execute instructions contemporaneously. Although FIG. 14 shows multiple processors 1402, the computer 1400 may include a single Processor with a single core, a single Processor with multiple cores (e.g., a multi-core Processor), multiple Processors with a single core, multiple Processors with multiples cores, or any combination thereof.

The memory 1404 includes a main memory 1412, a static memory 1414, and a storage unit 1416, both accessible to the processors 1402 via the 1444. The main memory 1404, the static memory 1414, and storage unit 1416 store the instructions 1408 embodying any one or more of the methodologies or functions described herein. The instructions 1408 may also reside, completely or partially, within the main memory 1412, within the static memory 1414, within machine-readable medium 1418 within the storage unit 1416, within at least one of the processors 1402 (e.g., within the Processor's cache memory), or any suitable combination thereof, during execution thereof by the computer 1400.

The I/O components 1442 may include a wide variety of Components to receive input, provide output, produce output, transmit information, exchange information, capture measurements, and so on. The specific I/O components 1442 that are included in a particular machine will depend on the type of machine. For example, portable machines such as mobile phones may include a touch input device or other such input mechanisms, while a headless server machine will likely not include such a touch input device. It will be appreciated that the I/O components 1442 may include many other Components that are not shown in FIG. 14. In various example embodiments, the I/O components 1442 may include 1428 and 1430. The 1428 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The 1430 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O components 1442 may include 1432, 1434, 1436, or 1438, among a wide array of other Components. For example, the 1432 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The 1434 include acceleration sensor Components (e.g., accelerometer), gravitation sensor Components, rotation sensor Components (e.g., gyroscope), and so forth. The 1436 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The 1438 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O components 1442 further include 1440 operable to couple the computer 1400 to a network 1420 or devices 1422 via a 1424 and a 1426, respectively. For example, the 1440 may include a network interface Component or another suitable device to interface with the network 1420. In further examples, the 1440 may include wired communication Components, wireless communication Components, cellular communication Components, Near Field Communication (NFC) Components, Bluetooth® Components (e.g., Bluetooth® Low Energy), Wi-Fi® Components, and other communication Components to provide communication via other modalities. The devices 1422 may be another machine or any of a wide variety of peripheral devices (e.g., a peripheral device coupled via a USB).

Moreover, the 1440 may detect identifiers or include Components operable to detect identifiers. For example, the 1440 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals). In addition, a variety of information may be derived via the 1440, such as location via Internet Protocol (IP) geolocation, location via Wi-Fi® signal triangulation, location via detecting an NFC beacon signal that may indicate a particular location, and so forth.

The various memories (e.g., memory 1404, main memory 1412, static memory 1414, and/or memory of the processors 1402) and/or storage unit 1416 may store one or more sets of instructions and data structures (e.g., software) embodying or used by any one or more of the methodologies or functions described herein. These instructions (e.g., the instructions 1408), when executed by processors 1402, cause various operations to implement the disclosed embodiments.

The instructions 1408 may be transmitted or received over the network 1420, using a transmission medium, via a network interface device (e.g., a network interface Component included in the 1440) and using any one of a number of well-known transfer protocols (e.g., hypertext transfer protocol (HTTP)). Similarly, the instructions 1408 may be transmitted or received using a transmission medium via the 1426 (e.g., a peer-to-peer coupling) to the devices 1422.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less all features of a single disclosed embodiment. Thus the following claims are hereby incorporated into the Detailed Description, with each claim standing on its own as a separate embodiment.

EXAMPLES

Example 1 is a method comprising: generating, using a camera of a mobile device, an image; accessing a virtual object corresponding to an object in the image; identifying shading parameters of the virtual object based on the object captured in the image and a machine learning model that is pre-trained with a paired dataset, the paired dataset comprising synthetic source data and synthetic target data, the synthetic source data comprising environment maps and three-dimensional (3D) scans of objects depicted in the environment maps, the synthetic target data comprising a synthetic sphere image rendered in the same environment map; applying the shading parameters to the virtual object; and displaying, in a display of the mobile device, the shaded virtual object as a layer to the image.

Example 2 includes the method of example 1, further comprising: accessing the synthetic source data; generating, using a neural network, predicted lighting parameters based on the synthetic source data; generating, using a differential renderer, a predicted sphere image based on the predicted lighting parameters; and comparing the predicted sphere image with the synthetic sphere image using a L2 loss function.

Example 3 includes the method of example 1, wherein the environment maps include a set of HDR environment maps, wherein the 3D scans of objects include a set of 3D facial scans of people depicted in a corresponding HDR environment map.

Example 4 includes the method of example 3, further comprising: training the machine learning model by: generating, using a first renderer, a synthetic face image based on the set of HDR environment maps and the set of 3D facial scans of people; generating, using a second renderer, a synthetic sphere image based on the set of HDR environment maps and a sphere asset; generating a predicted sphere image based on the synthetic face image; and comparing the predicted sphere image with the synthetic sphere image using a L2 loss function.

Example 5 includes the method of example 4, further comprising: predicting, using a neural network, spherical Gaussians and ambient light based on the synthetic face image; and generating, using a differential render, the predicted sphere image based on the sphere asset, the spherical Gaussians, and the ambient light.

Example 6 includes the method of example 1, wherein applying the shading parameters to the virtual object comprises: providing the shading parameters to a physically based rendering (PBR) shader; and applying, using the PBR shader, estimated lighting conditions to the virtual object.

Example 7 includes the method of example 1, wherein the image includes a self-portrait image of a user of the mobile device, wherein the 3D scans of items include a set of 3D facial scans of people depicted in a corresponding environment map.

Example 8 is computing apparatus comprising: a processor; and a memory storing instructions that, when executed by the processor, configure the computing apparatus to: generate, using a camera of a mobile device, an image; access a virtual object corresponding to an object in the image; identify shading parameters of the virtual object based on the object captured in the image and a machine learning model that is pre-trained with a paired dataset, the paired dataset comprising synthetic source data and synthetic target data, the synthetic source data comprising environment maps and three-dimensional (3D) scans of objects depicted in the environment maps, the synthetic target data comprising a synthetic sphere image rendered in the same environment map; apply the shading parameters to the virtual object; and display, in a display of the mobile device, the shaded virtual object as a layer to the image.

Example 9 includes the computing apparatus of example 8, wherein the instructions further configure the computing apparatus to: access the synthetic source data; generate, using a neural network, predicted lighting parameters based on the synthetic source data; generate, using a differential renderer, a predicted sphere image based on the predicted lighting parameters; and compare the predicted sphere image with the synthetic sphere image using a L2 loss function.

Example 10 includes the computing apparatus of example 8, wherein the environment maps include a set of HDR environment maps, wherein the 3D scans of objects include a set of 3D facial scans of people depicted in a corresponding HDR environment map.

Example 11 includes the computing apparatus of example 10, wherein the instructions further configure the computing apparatus to: train the machine learning model by: generate, using a first renderer, a synthetic face image based on the set of HDR environment maps and the set of 3D facial scans of people; generate, using a second renderer, a synthetic sphere image based on the set of HDR environment maps and a sphere asset; generate a predicted sphere image based on the synthetic face image; and compare the predicted sphere image with the synthetic sphere image using a L2 loss function.

Example 12 includes the computing apparatus of example 11, wherein the instructions further configure the computing apparatus to: predict, using a neural network, spherical Gaussians and ambient light based on the synthetic face image; and generate, using a differential render, the predicted sphere image based on the sphere asset, the spherical Gaussians, and the ambient light.

Example 13 includes the computing apparatus of example 8, wherein applying the shading parameters to the virtual object comprises: provide the shading parameters to a physically based rendering (PBR) shader; and apply, using the PBR shader, estimated lighting conditions to the virtual object.

Example 14 includes the computing apparatus of example 8, wherein the image includes a self-portrait image of a user of the mobile device, wherein the 3D scans of objects include a set of 3D facial scans of people depicted in a corresponding environment map.

Example 15 is a non-transitory computer-readable storage medium, the computer-readable storage medium including instructions that when executed by a computer, cause the computer to: generate, using a camera of a mobile device, an image; access a virtual object corresponding to an object in the image; identify shading parameters of the virtual object based on the object captured in the image and a machine learning model that is pre-trained with a paired dataset, the paired dataset comprising synthetic source data and synthetic target data, the synthetic source data comprising environment maps and three-dimensional (3D) scans of objects depicted in the environment maps, the synthetic target data comprising a synthetic sphere image rendered in the same environment map; apply the shading parameters to the virtual object; and display, in a display of the mobile device, the shaded virtual object as a layer to the image.

Example 16 includes the computer-readable storage medium of example 15, wherein the instructions further cause the computer to: access the synthetic source data; generate, using a neural network, predicted lighting parameters based on the synthetic source data; generate, using a differential renderer, a predicted sphere image based on the predicted lighting parameters; and compare the predicted sphere image with the synthetic sphere image using a L2 loss function.

Example 17 includes the computer-readable storage medium of example 15, wherein the environment maps include a set of HDR environment maps, wherein the 3D scans of objects include a set of 3D facial scans of people depicted in a corresponding HDR environment map.

Example 18 includes the computer-readable storage medium of example 17, wherein the instructions further cause the computer to: train the machine learning model by: generate, using a first renderer, a synthetic face image based on the set of HDR environment maps and the set of 3D facial scans of people; generate, using a second renderer, a synthetic sphere image based on the set of HDR environment maps and a sphere asset; generate a predicted sphere image based on the synthetic face image; and compare the predicted sphere image with the synthetic sphere image using a L2 loss function.

Example 19 includes the computer-readable storage medium of example 18, wherein the instructions further cause the computer to: predict, using a neural network, spherical Gaussians and ambient light based on the synthetic face image; and generate, using a differential render, the predicted sphere image based on the sphere asset, the spherical Gaussians, and the ambient light.

Example 20 includes the computer-readable storage medium of example 15, wherein applying the shading parameters to the virtual object comprises: provide the shading parameters to a physically based rendering (PBR) shader; and apply, using the PBR shader, estimated lighting conditions to the virtual object, wherein the image includes a self-portrait image of a user of the mobile device, wherein the 3D scans of objects include a set of 3D facial scans of people depicted in a corresponding environment map.

Glossary

"Carrier Signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both Machine-Storage Media and transmission media. Thus, the terms include both storage devices/media and carrier waves/ modulated data signals. The terms "machine-readable medium," "Computer-Readable Medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of Machine-Storage Media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "Machine-Storage Medium," "device-storage medium," "computer-storage medium" mean the same thing and may be used interchangeably in this disclosure. The terms "Machine-Storage Media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
   generating, using a camera of a mobile device, an image;
   accessing a virtual object corresponding to an object in the image;
   identifying shading parameters of the virtual object based on the object captured in the image and a machine learning model that is pre-trained with a paired dataset, the paired dataset comprising synthetic source data and synthetic target data, the synthetic source data comprising environment maps and three-dimensional (3D) scans of objects depicted in the environment maps, the synthetic target data comprising a synthetic sphere image rendered in a same environment map, wherein the environment maps include a set of HDR (High Dynamic Range) environment maps, wherein the 3D scans of objects include a set of 3D facial scans of people depicted in a corresponding HDR environment map of the set of HDR environment maps;
   training the machine learning model by:
      generating, using a first renderer, a synthetic face image based on the set of HDR (High Dynamic Range) environment maps and the set of 3D facial scans of people;
      generating, using a neural network, predicted lighting parameters based on the synthetic face image;
      generating, using a differential renderer, a predicted sphere image based on the predicted lighting parameters and a sphere asset that comprises synthetic sphere 3D models;
      generating, using a second renderer, the synthetic sphere image based on the set of HDR environment maps and the sphere asset;
      comparing the predicted sphere image with the synthetic sphere image using a L2 loss function; and
      training the neural network using a result of the L2 loss function via back-propagation;
   applying the shading parameters to the virtual object to generate a shaded virtual object; and
   displaying, in a display of the mobile device, the shaded virtual object as a layer to the image.

2. The method of claim 1, further comprising:
   predicting, using the neural network, spherical Gaussians and ambient light based on the synthetic face image; and
   generating, using the differential renderer, the predicted sphere image based on the sphere asset, the spherical Gaussians, and the ambient light.

3. The method of claim 1, wherein applying the shading parameters to the virtual object comprises:
   providing the shading parameters to a physically based rendering (PBR) shader; and
   applying, using the PBR shader, estimated lighting conditions to the virtual object.

4. The method of claim 1, wherein the image includes a self-portrait image of a user of the mobile device.

5. A computing apparatus comprising:
   a processor; and
   a memory storing instructions that, when executed by the processor, configure the computing apparatus to:
   generate, using a camera of a mobile device, an image;
   access a virtual object corresponding to an object in the image;
   identify shading parameters of the virtual object based on the object captured in the image and a machine learning model that is pre-trained with a paired dataset, the paired dataset comprising synthetic source data and synthetic target data, the synthetic source data comprising environment maps and three-dimensional (3D) scans of objects depicted in the environment maps, the synthetic target data comprising a synthetic sphere image rendered in a same environment map, wherein the environment maps include a set of HDR (High Dynamic Range) environment maps, wherein the 3D scans of objects include a set of 3D facial scans of people depicted in a corresponding HDR environment map of the set of HDR environment maps;
   training the machine learning model by:

generating, using a first renderer, a synthetic face image based on the set of HDR (High Dynamic Range) environment maps and the set of 3D facial scans of people;

generating, using a neural network, predicted lighting parameters based on the synthetic face image;

generating, using a differential renderer, a predicted sphere image based on the predicted lighting parameters and a sphere asset that comprises synthetic sphere 3D models;

generating, using a second renderer, the synthetic sphere image based on the set of HDR environment maps and the sphere asset;

comparing the predicted sphere image with the synthetic sphere image using a L2 loss function; and training the neural network using a result of the L2 loss function via back-propagation;

apply the shading parameters to the virtual object; and display, in a display of the mobile device, the shaded virtual object as a layer to the image.

6. The computing apparatus of claim 5, wherein the instructions further configure the computing apparatus to:
predict, using the neural network, spherical Gaussians and ambient light based on the synthetic face image; and
generate, using the differential renderer, the predicted sphere image based on the sphere asset, the spherical Gaussians, and the ambient light.

7. The computing apparatus of claim 5, wherein applying the shading parameters to the virtual object comprises:
provide the shading parameters to a physically based rendering (PBR) shader; and
apply, using the PBR shader, estimated lighting conditions to the virtual object.

8. The computing apparatus of claim 5, wherein the image includes a self-portrait image of a user of the mobile device.

9. A non-transitory computer-readable storage medium, the computer-readable storage medium including instructions that when executed by a computer, cause the computer to:
generate, using a camera of a mobile device, an image;
access a virtual object corresponding to an object in the image;
identify shading parameters of the virtual object based on the object captured in the image and a machine learning model that is pre-trained with a paired dataset, the paired dataset comprising synthetic source data and synthetic target data, the synthetic source data comprising environment maps and three-dimensional (3D) scans of objects depicted in the environment maps, the synthetic target data comprising a synthetic sphere image rendered in a same environment map, wherein the environment maps include a set of HDR (High Dynamic Range) environment maps, wherein the 3D scans of objects include a set of 3D facial scans of people depicted in a corresponding HDR environment map of the set of HDR environment maps;

training the machine learning model by:
generating, using a first renderer, a synthetic face image based on the set of HDR (High Dynamic Range) environment maps and the set of 3D facial scans of people;

generating, using a neural network, predicted lighting parameters based on the synthetic face image;

generating, using a differential renderer, a predicted sphere image based on the predicted lighting parameters and a sphere asset that comprises synthetic sphere 3D models;

generating, using a second renderer, the synthetic sphere image based on the set of HDR environment maps and the sphere asset;

comparing the predicted sphere image with the synthetic sphere image using a L2 loss function; and training the neural network using a result of the L2 loss function via back-propagation;

apply the shading parameters to the virtual object; and display, in a display of the mobile device, the shaded virtual object as a layer to the image.

10. The computer-readable storage medium of claim 9, wherein the instructions further cause the computer to:
predict, using the neural network, spherical Gaussians and ambient light based on the synthetic face image; and
generate, using the differential renderer, the predicted sphere image based on the sphere asset, the spherical Gaussians, and the ambient light.

11. The computer-readable storage medium of claim 9, wherein applying the shading parameters to the virtual object comprises:
provide the shading parameters to a physically based rendering (PBR) shader; and
apply, using the PBR shader, estimated lighting conditions to the virtual object,
wherein the image includes a self-portrait image of a user of the mobile device.

* * * * *